(12) United States Patent
Meert

(10) Patent No.: US 7,350,994 B2
(45) Date of Patent: Apr. 1, 2008

(54) EYEGLASS CLEANER

(76) Inventor: Philippe Meert, Aaigemdorp 84, 9420 Aaigem (BE)

(\*) Notice: Subject to any disclaimer, the term of this patent is extended or adjusted under 35 U.S.C. 154(b) by 254 days.

(21) Appl. No.: 10/823,247

(22) Filed: Apr. 13, 2004

(65) Prior Publication Data

US 2005/0226678 A1    Oct. 13, 2005

(51) Int. Cl.
*A46B 15/00* (2006.01)
*A46B 11/00* (2006.01)
*A46B 11/02* (2006.01)

(52) U.S. Cl. .................... 401/10; 401/9; 401/188 R

(58) Field of Classification Search ............ 401/9, 401/10, 188 R, 190
See application file for complete search history.

(56) References Cited

U.S. PATENT DOCUMENTS

| 2,055,314 | A | | 9/1936 | Seburger |
| 2,908,923 | A | * | 10/1959 | Schlechter .................. 401/10 |
| 3,048,878 | A | * | 8/1962 | Gray et al. .................. 401/10 |
| 3,643,279 | A | | 2/1972 | DeBruhl |
| 4,347,010 | A | | 8/1982 | Petkoff |
| 4,434,520 | A | | 3/1984 | Caniglia |
| 4,940,349 | A | * | 7/1990 | Jansen van Rensburg .... 401/10 |
| 5,222,268 | A | | 6/1993 | Snodgrass |
| 5,457,842 | A | | 10/1995 | Chang |
| 5,499,474 | A | * | 3/1996 | Knooihuizen ................. 47/1.5 |
| 5,988,910 | A | | 11/1999 | Yahav |
| 6,339,860 | B1 | | 1/2002 | Chen |

\* cited by examiner

*Primary Examiner*—David J. Walczak

(57) ABSTRACT

An apparatus for cleaning eyeglasses that includes a housing, a fluid reservoir, and an evacuation apparatus such as a pump for pressurized evacuation of fluid out of the fluid reservoir and an atomizer trigger coupled to the evacuation apparatus. Two arms are attached to the housing at their proximal ends and in their normal orientations extend, preferably at an outward angle, from the housing. In a representative embodiment, each arm has a wiping pad at its distal end and is spring biased into its nominal orientation such that the wiping pads may be compressed toward each other.

15 Claims, 17 Drawing Sheets

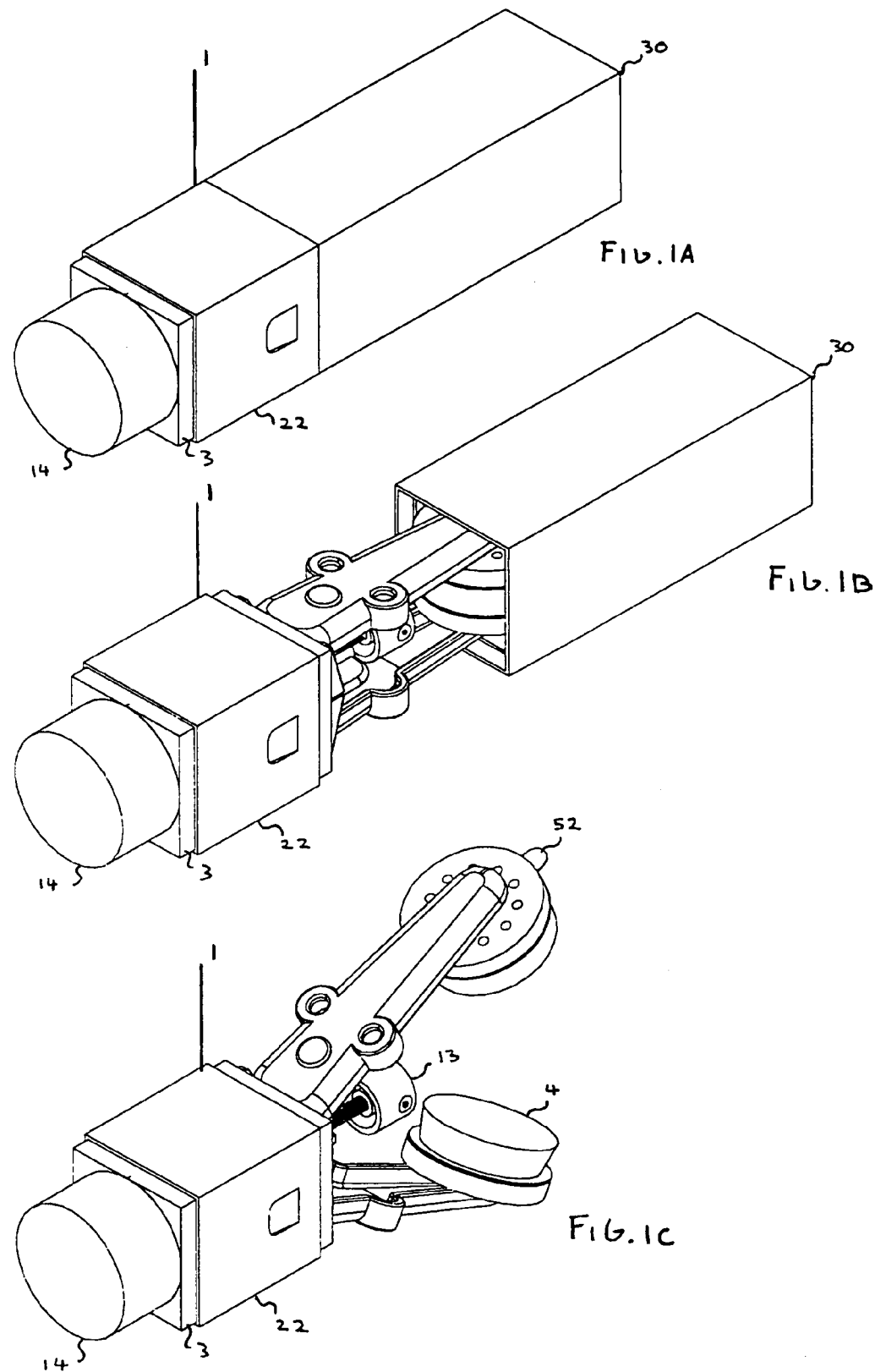

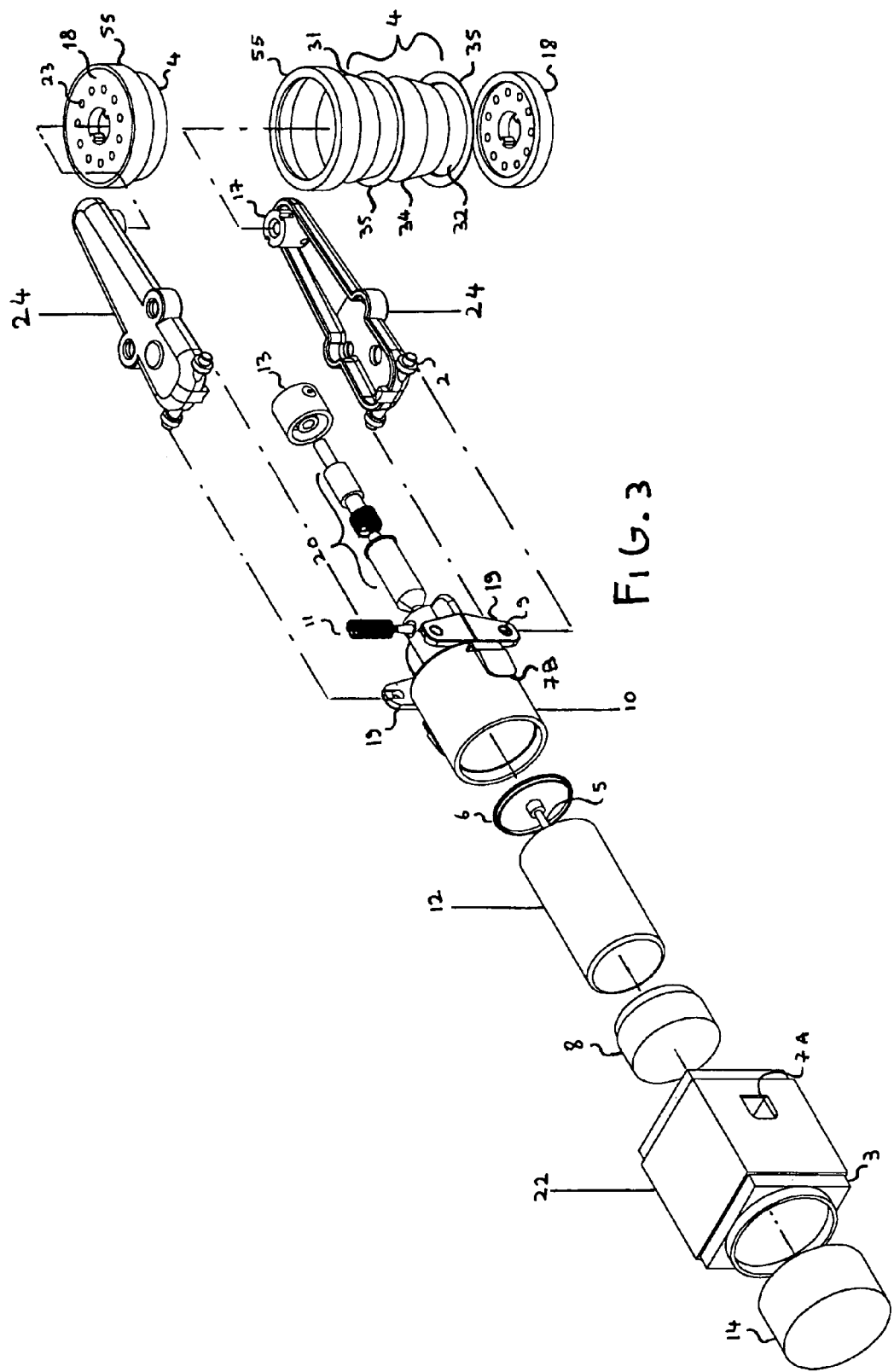

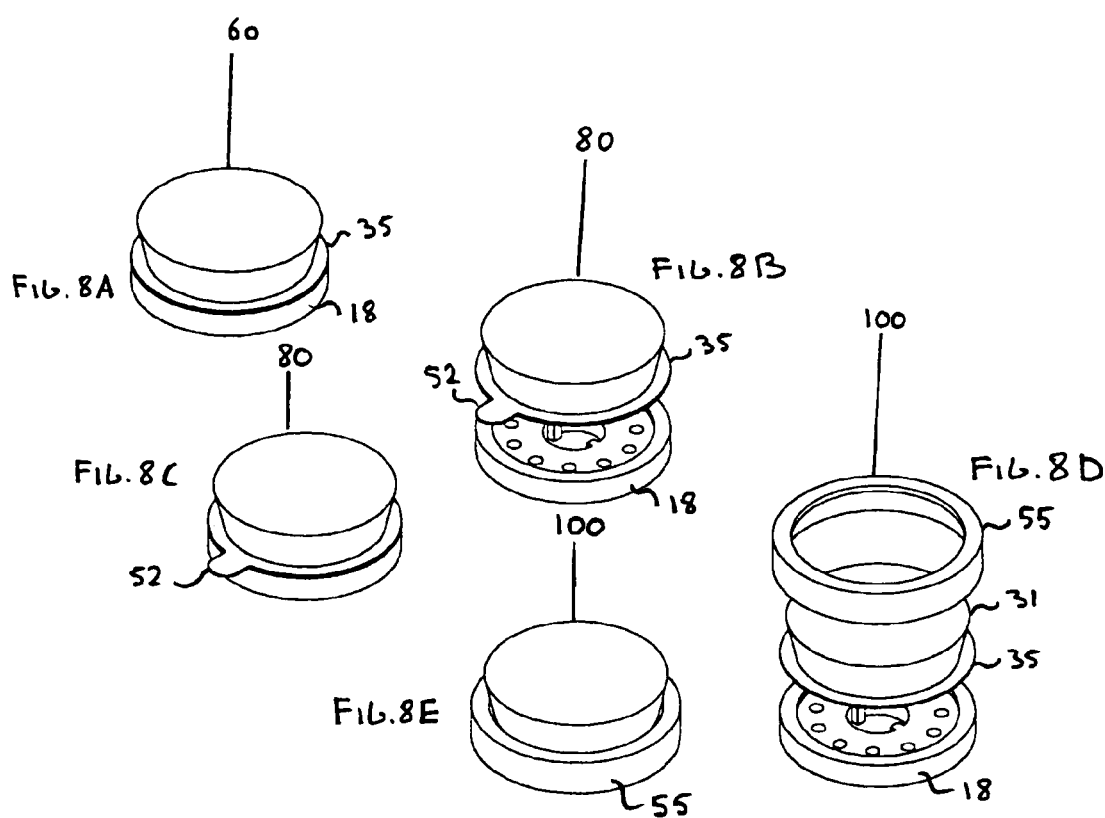

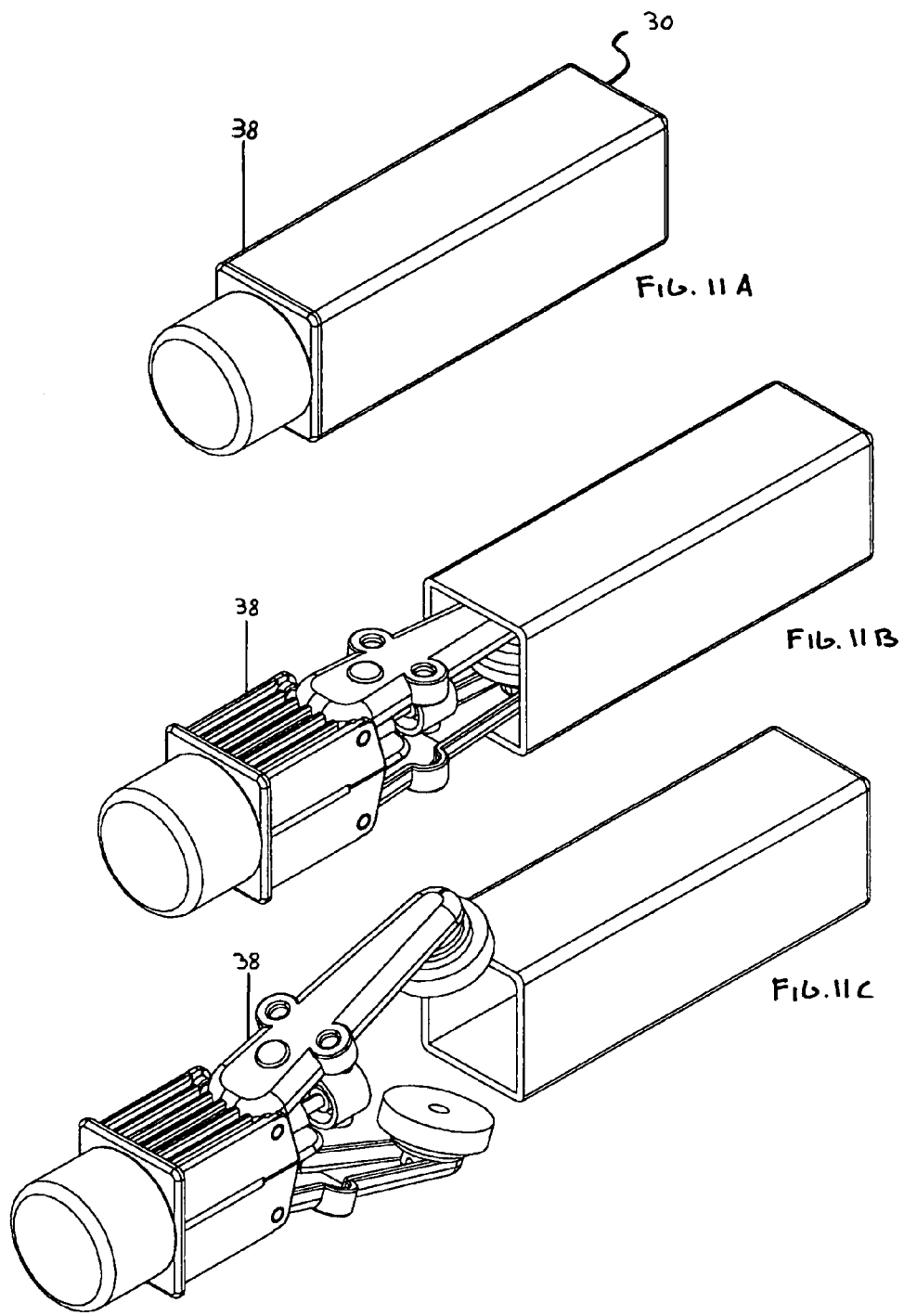

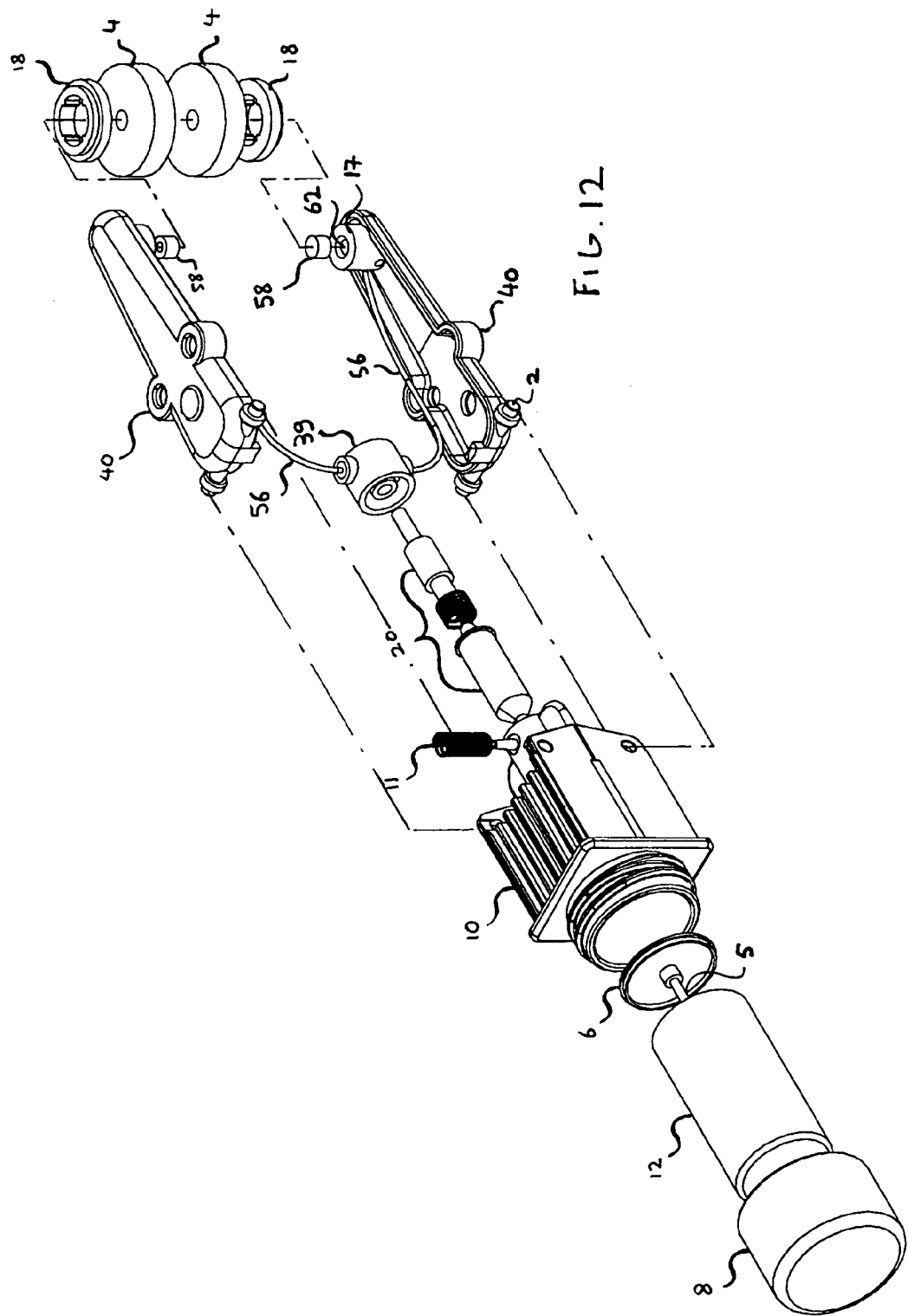

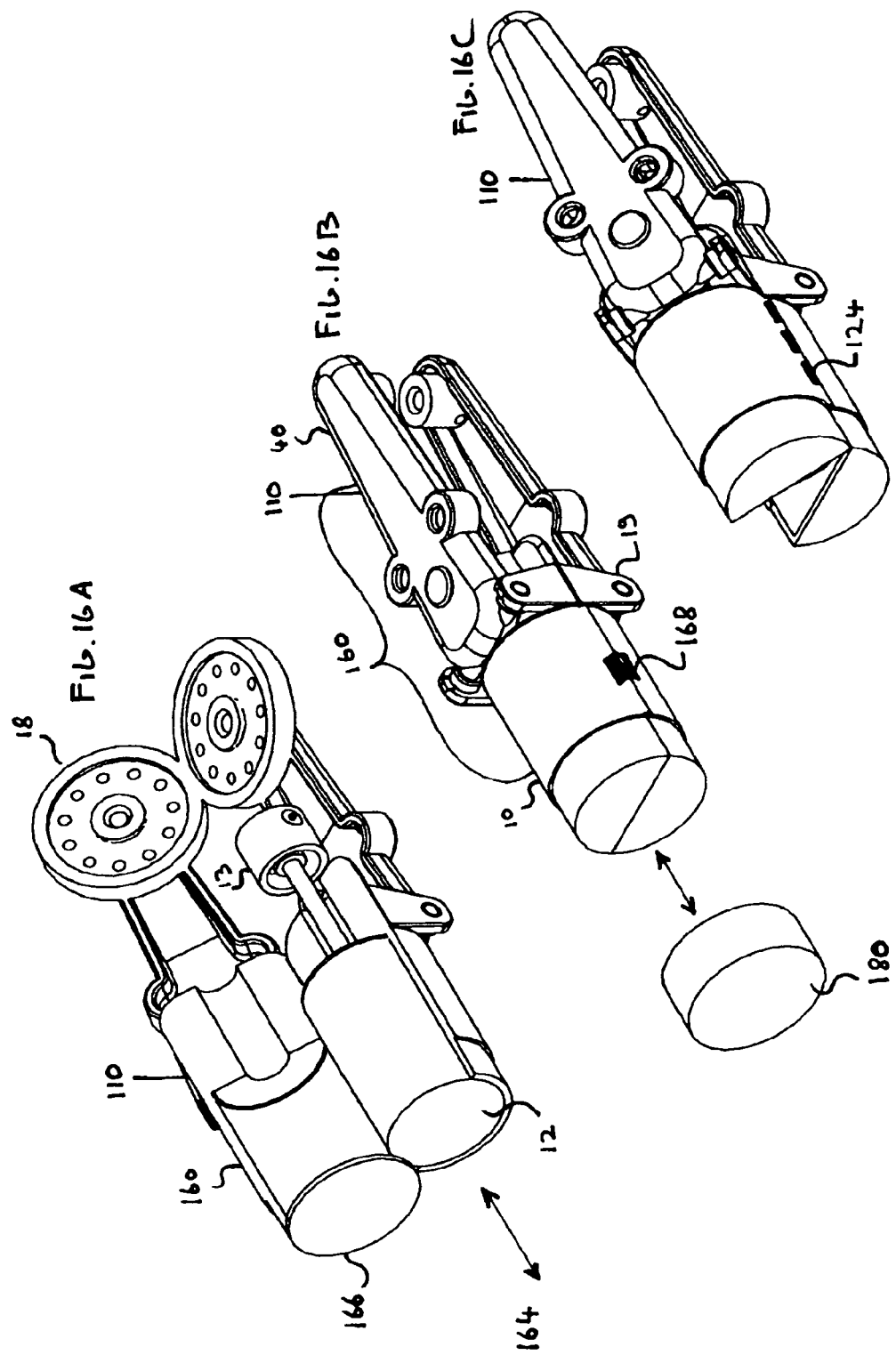

EYEGLASS CLEANER

BACKGROUND OF THE INVENTION

1. Field of the Invention

The present invention pertains to devices for cleaning eyeglasses, and is particularly applicable to small, portable, self-contained devices for cleaning eyeglasses.

2. Description of the Related Art

It can be appreciated that eyeglass cleaning apparatuses have been in use for years. Typical eyeglass cleaning devices include a spray dispenser, which may or may not be attach to the main device, together with cleaning cloths or pre-wetted cloths attached to rollers or arms.

However, the main problem with many conventional devices and methods is that the spray dispenser and cloth are two separate items that have to be carried around by the user. This is very unpractical. The pre-wetted cloths have to be taken out of a package first, and then when the cleaning is completed, the user is required to store the package and dispose of the dirty cloth.

However, even when conventional devices include all necessary components in a single container, they often still are bulky and, in many aspects, difficult to use and/or to produce. Typical examples are described in U.S. Pat. No. 4,347,010 ("Cleaning Device for Eyeglass") and in U.S. Pat. No. 5,222,268 ("Pocket Eyeglass Cleaner Apparatus"). For example, many prior art devices, due to the way they are constructed, can not be manufactured in a suitable industrial manner.

Often, the conventional eyeglass-cleaning devices also have a problem with their cleaning-liquid systems. When pointing a conventional device in a certain position, for example downwards, cleaning liquid often will start leaking. Such conventional devices typically don't have an adequate system of sealing their liquid containers. In addition, it often is not possible for the user to use up all of the cleaning liquid in a conventional device. This poses a problem for when the liquid system has to be refilled. In addition, conventional devices typically don't have a system where the liquid container can be replaced. Still further, conventional devices often can't be dosed properly. That is, there often is no control over how much liquid is transferred.

Another problem is that many conventional eyeglass cleaning devices don't have an easy-to-access and adequate system of replacing the wiping components. In fact, with many such devices, it is almost impossible to replace the wiping components. Therefore, most conventional wiping components are attached onto a plate or disc, which is then attached to the remainder of the device.

Conventional devices are also laborious in use because they often can't be used immediately. Instead, they usually first have to be pulled and placed in a certain position before they can be used.

Another problem is that most conventional devices are not very handy in use to place, position and clean the eyeglass. For example, accumulation of cleaning liquid at the edge of the eyeglass-frame is a common problem with many conventional devices.

In short, a suitable, practical, user-friendly and industrially manufacturable solution and system of replacing the wiping components is missing in the conventional devices.

SUMMARY OF THE INVENTION

The present invention addresses the foregoing problems in a number of different ways, according to the various embodiments described below, such as by combining all the necessary components into a portable and easy-to-use device, utilizing arms that are spring-biased toward an outward orientation, utilizing particular pump and/or fluid reservoirs systems (e.g., replaceable capsules filled with a cleaning liquid).

Thus, in one aspect the invention is directed to an apparatus for cleaning eyeglasses that includes a housing, a fluid reservoir, and evacuation means for pressurized evacuation of fluid out of the fluid reservoir. Two arms are attached to the housing at their proximal ends and, in their nominal orientations, extend at an outward angle from the housing and from each other. Each arm has a wiping pad at its distal end and is spring-biased into its nominal orientation, such that the wiping pads may be compressed toward each other.

By utilizing outwardly spring-biased arms in the foregoing manner, the device of the present invention typically provides easy access to the wiping components, often making it relatively easy to replace the wiping components by obviating the need to manually separate the wiping arms prior to replacing the wiping components. This can also make it possible to use replaceable wiping components (e.g., fabric with soft pad, etc) without any support plate, disc, etc. being attached onto the wiping component. Generally, this is also highly desirable for a suitable industrial manufacturing of these wiping components.

Moreover, by virtue of this feature of the present invention, often the only thing that has to be done is to pull the device out of a provided storage container and then it is ready to be used. This feature of the present invention can enable the user to easily compress the arms over the eyeglass and, in certain embodiments, creates enough room to easily push with one finger on top of an atomiser button or similar device for applying the cleaning fluid.

When finished cleaning, the arms typically open automatically, so that the cleaning device can be easily removed from the eyeglass, without creating an accumulation of cleaning liquid at the edge of the eyeglass-frame, which often is a problem in many conventional devices. As a result, a better feel and freer motion onto the eyeglass often is obtained.

In addition, as described in more detail below, certain devices according to the present invention include configurations of wiping components and ways to replaceably attach them that address many of the shortcomings in the prior art that have been described above.

In another aspect, the invention is directed to an apparatus for cleaning eyeglasses that includes a housing, a fluid reservoir (preferably a disposable capsule filled with a cleaning liquid), a pump coupled to the fluid reservoir for pumping fluid out of the fluid reservoir, and two arms attached to the housing at their proximal ends and extending from the housing. Each arm has a wiping pad at its distal end and is spring-biased into a nominal orientation. Also, according to this aspect of the invention, the fluid reservoir is substantially shape-retaining and is provided with a burstable seal.

By utilizing a substantially shape-retaining fluid reservoir having a burstable seal, the present invention often can provide a very easy, accessible and practical, efficient, industrially applicable system of adequately replacing a liquid capsule.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIGS. 1A-C illustrate perspective views of an eyeglass-cleaning device according to a first representative embodiment of the invention, with the cover on, partially removed and then fully removed, respectively.

FIG. 3 shows an exploded perspective view of the eyeglass-cleaning device according to the first embodiment of the invention.

FIG. 4 illustrates a cross-sectional front view of the eyeglass-cleaning device according to the first embodiment of the invention, with the cover on.

FIG. 8A illustrates a first representative embodiment of a wiping component assembly having no detachable components; FIG. 8B illustrates an exploded view of the detachable components of a second representative embodiment of a wiping component assembly; FIG. 8C illustrates an assembled view of the second representative embodiment of a wiping component assembly; FIG. 8D illustrates an exploded view of the detachable components of a third representative embodiment of a wiping component assembly; FIG. 8E illustrates an assembled view of the third representative embodiment of a wiping component assembly.

FIGS. 11A-C illustrate perspective views of a device according to a second embodiment of the invention, with the cover on, partially removed and then fully removed, respectively.

FIG. 12 provides an exploded view of the device according to the second embodiment of the invention.

FIGS. 16A-C illustrate the following perspective views of a device according to a third representative embodiment of the invention: a front view with the wiping arms partially folded open and backing plates attached thereto, a rear view with the wiping arms closed but no backing plates attached, and a rear view with the wiping arms open but no backing plates attached, respectively.

DESCRIPTION OF THE PREFERRED EMBODIMENT(S)

Figures 2A, 2B:
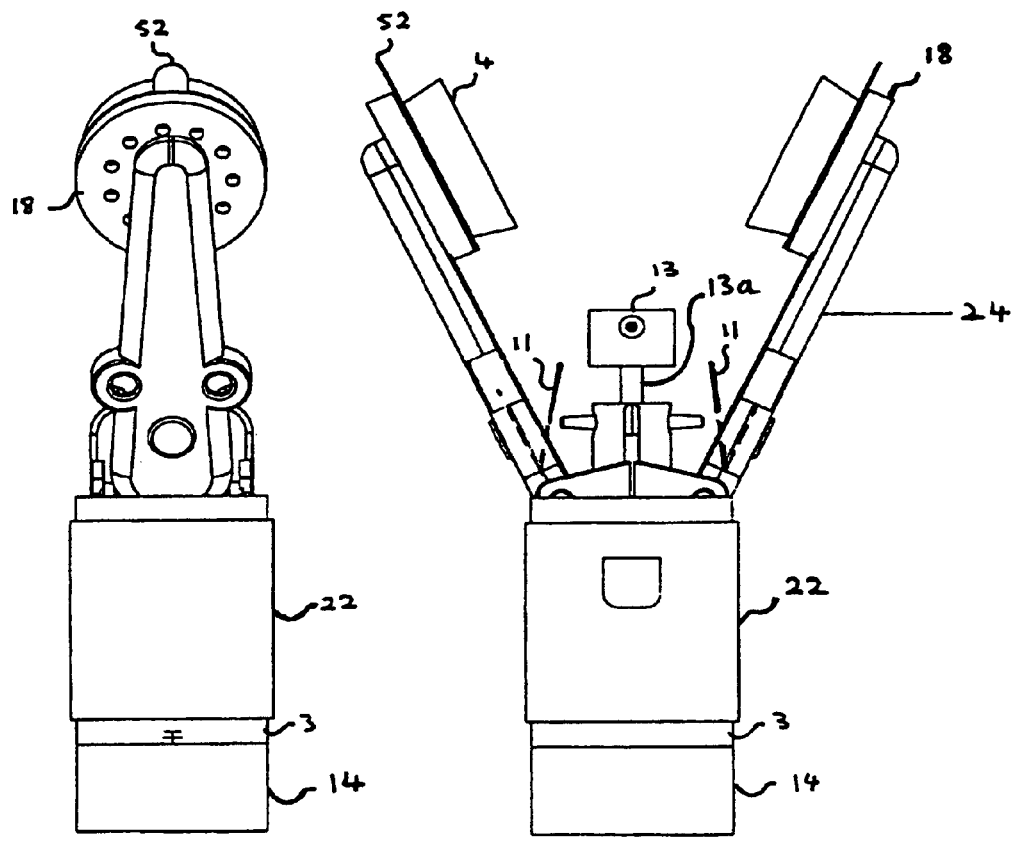
FIGS. 2A and 2B illustrate a side elevational view and a front elevational view, respectively, of the eyeglass-cleaning device according to the first embodiment of the invention.

Generally speaking, the present invention concerns a portable eyeglass-cleaning device for eyeglasses, such as device 1 shown in FIGS. 1A-C. As shown in FIGS. 1-5, device 1 preferably includes a storage cover 30 that may be slidably attached to or removed from the remainder of device 1. Upon removal of storage cover 30, wiping arms 24 preferably automatically pivot (or bend) outwardly, due to a biasing of arms 24 that is described in more detail below. At the end of each wiping arm 24 is a wiping component 4 that can be used to clean an eyeglass spectacle (shown in FIGS. 9 and 10). Between arms 24 is an atomizer button 13 for spraying cleaning fluid onto the eyeglass spectacle.

Figure 13A:
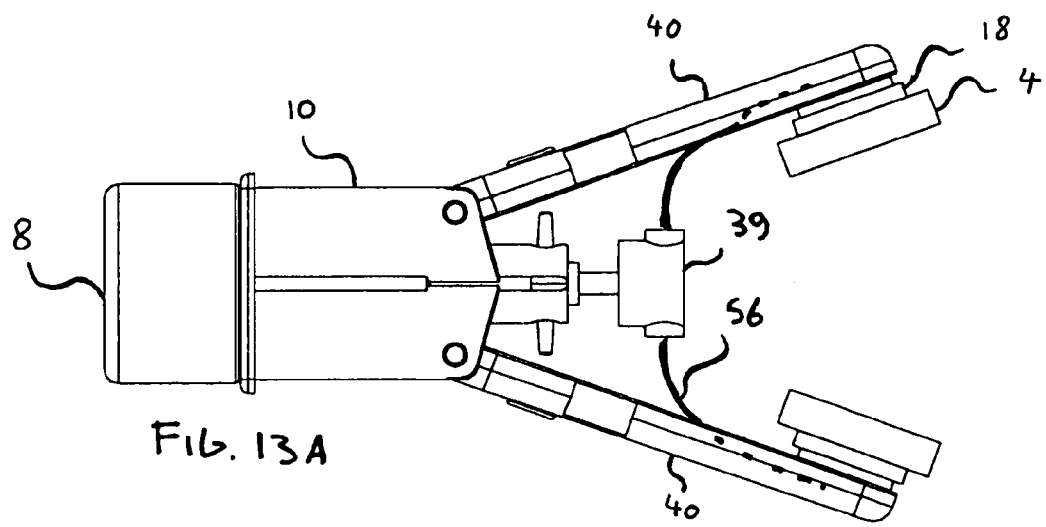
FIGS. 13A and 13B illustrate rear and side elevational views of the device according to the second embodiment of the invention.
Figure 13B:
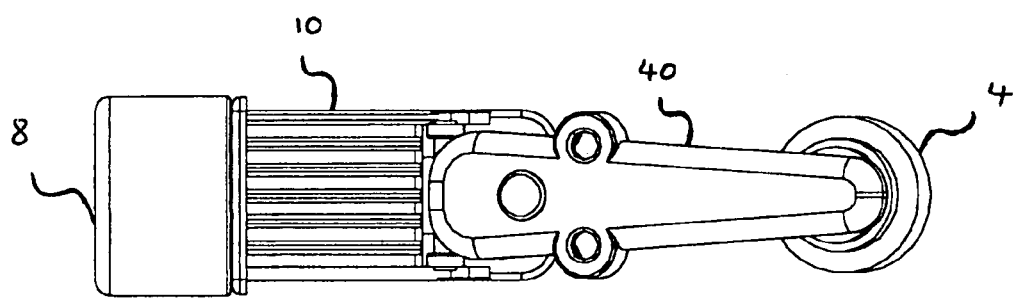
Figure 14:
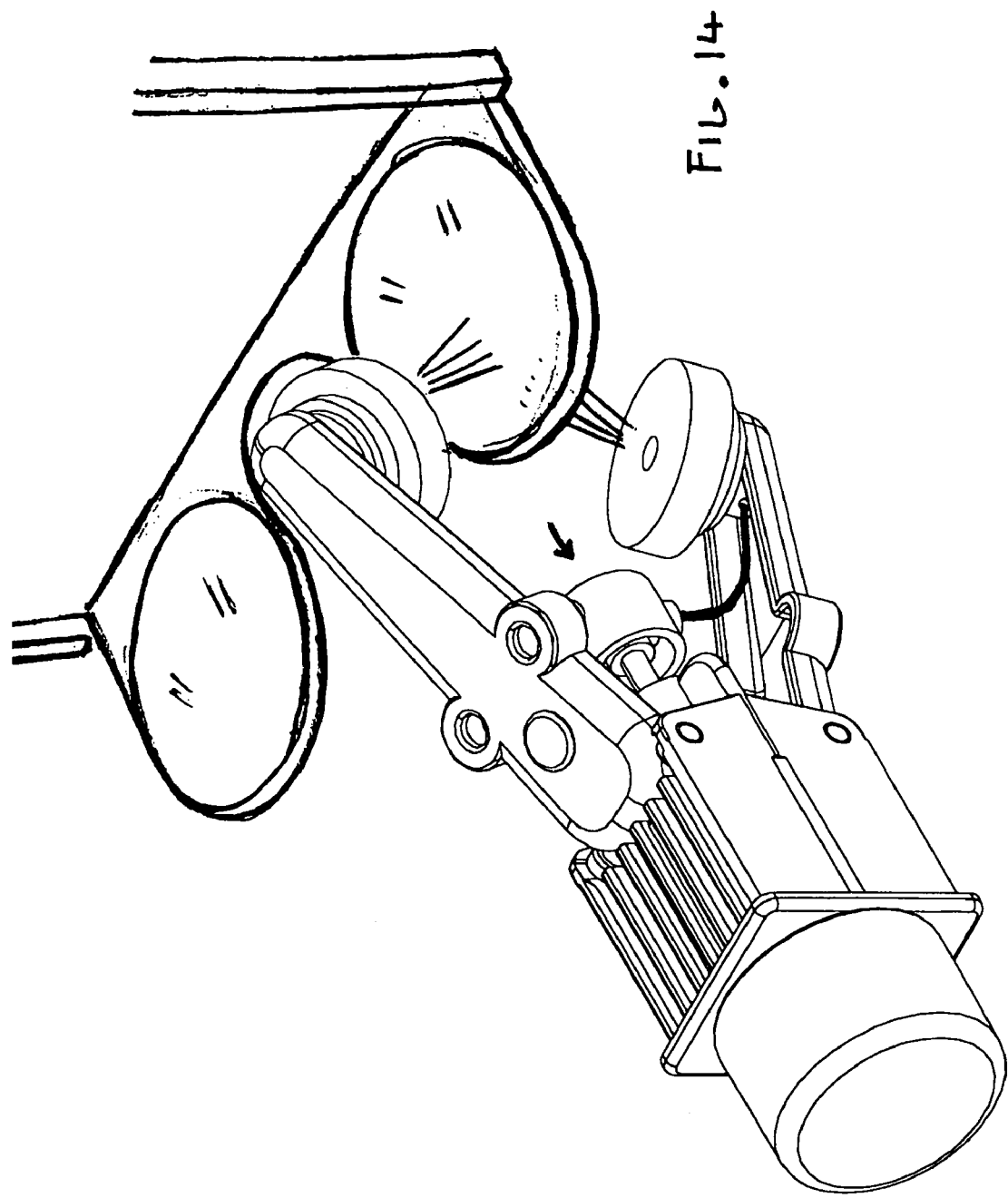
FIG. 14 shows a perspective view of the device according to the second embodiment, with liquid is being atomised from the wiping component onto both sides of a spectacle lens.

In another embodiment, shown in FIGS. 11-14, a portable eyeglass-cleaning device 38 is provided. The device 38 is similar to device 1, but rather than having a spraying nozzle (e.g., atomizer button 13) that is disposed between the wiping arms, in the present embodiment device 38 has hoses 56 that direct the cleaning fluid through the wiping arms 40 and either into or through wiping components 4. In this way, the cleaning fluid can be sprayed onto the eyeglass spectacle directly from wiping components 4, as shown in FIG. 14. Alternatively, the cleaning fluid may be pumped into wiping components 4 (not shown), thereby wetting them so that they can be used to wipe the eyeglass spectacle.

In a still further embodiment, shown in FIGS. 16A-C, an eyeglass-cleaning device 110 has wiping arms 140 that open and close against each other by using a structure that is hinged along one edge. In this embodiment, the cleaning fluid emission can be configured as discussed herein with respect to the first embodiment (e.g., device 1), as discussed herein with respect to the second embodiment (e.g., device 38), or in any other manner.

The following discussion begins with a description of the common components and then generally covers the first through third embodiments in order. However, it should be understood that many of the features and components, as well as the possible variations in the same, will be common across all three embodiments.

The size of the device (e.g., 1, 38 or 110) preferably is small enough so it can easily be placed in a trousers pocket. For example, the device when closed might have dimensions of approximately: 4 inches by 1.2 inch by 1 inch.

Description of the Different Parts and the Relation Between Them

Figure 4:
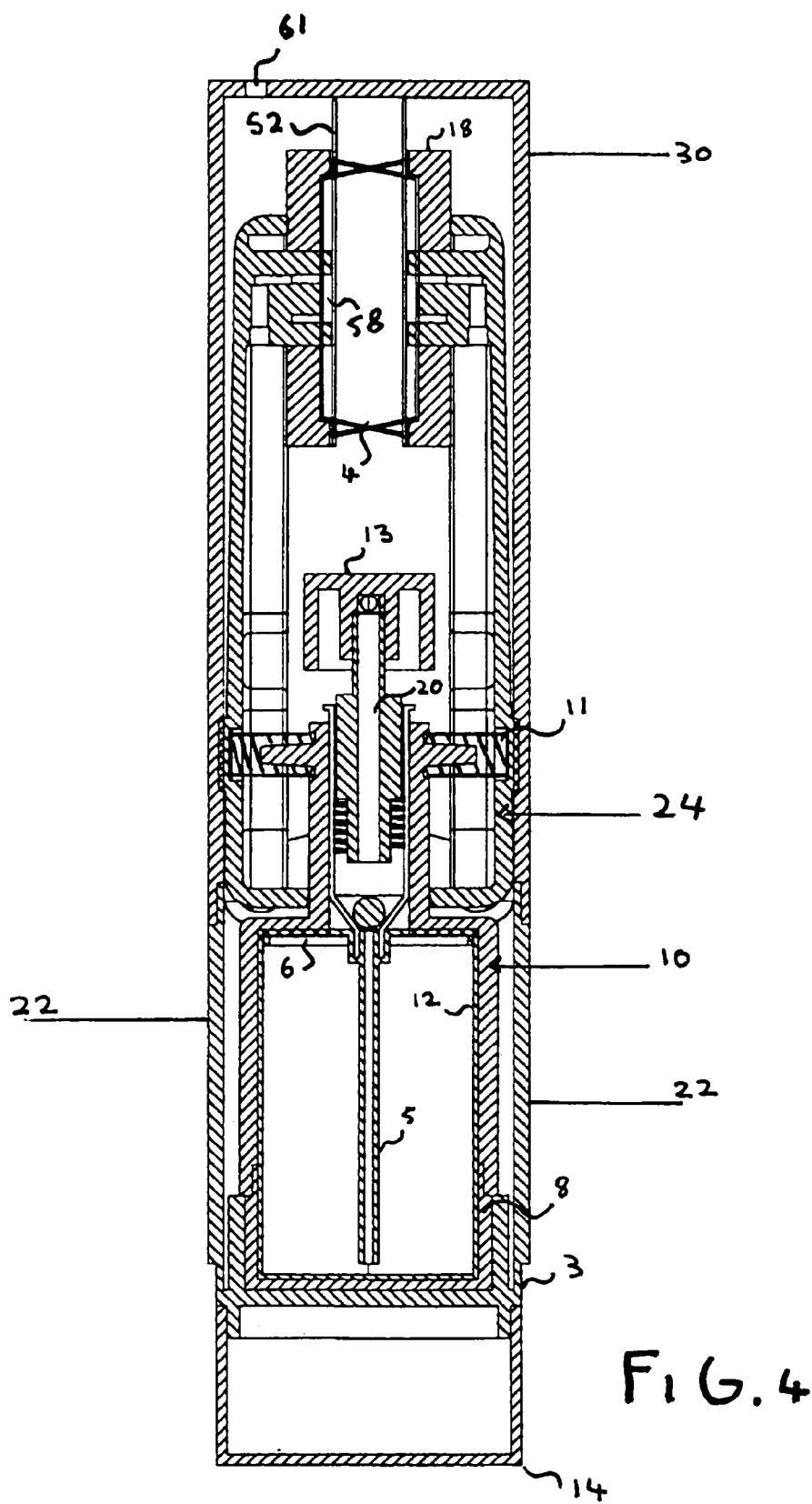
Figure 5:
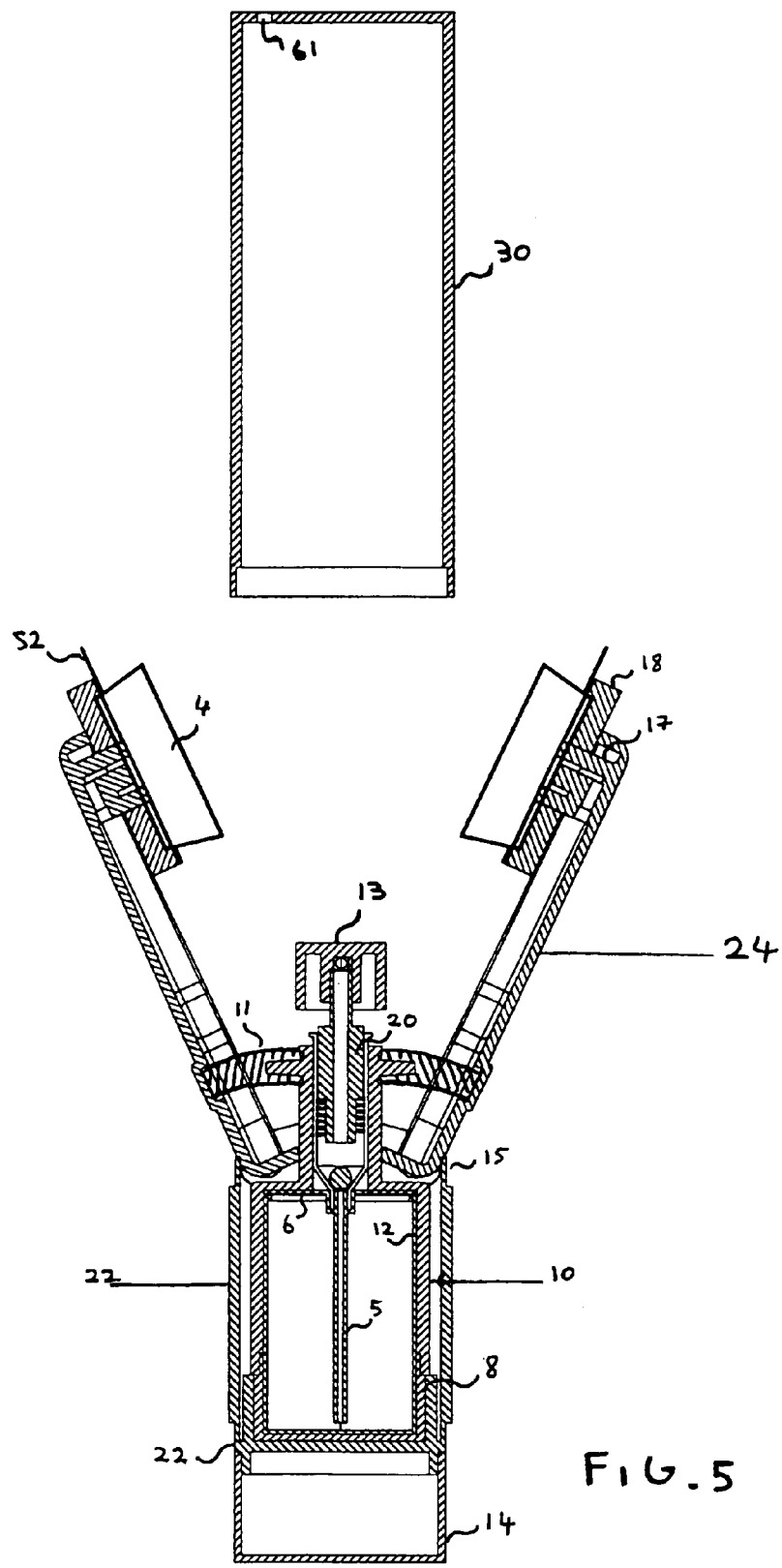
FIG. 5 illustrates a cross-sectional front view of the eyeglass-cleaning device according to the first embodiment of the invention, with the storage cover removed.

The following describes the components of a representative eyeglass-cleaning device according to the present invention. Reference is made to FIGS. 3 and 4, which illustrate the eyeglass-cleaning device 1.

4 Two preferably replaceable wiping components, closed or with a hole in the middle. Preferably, each wiping component is comprised of two pieces of fabric, reinforced paper cloth or other suitable wiping material 31 and 32, and a soft pad with an oblique section that is captured inside the two wiping pieces 31 and 32. They are fixed, replaceably or permanently, onto the plates 18.

6 A sealing cap is placed on top of the capsule 12. It includes a flat circular cap 6 with a hose 5 in the middle, running all the way to the bottom of the capsule 12. See FIGS. 3 and 4. The capsule 12, sealing cap 6 and hose 5 can be separate parts or one integrated part, preferably manufactured with injection, blow, or rotation molding. The liquid capsule 12 is filled with cleaning liquid on an industrial base; then a sealing cap 6 of a suitable burstable material is placed and fixed over or on top of the capsule 12. By inserting and pushing capsule 12 into casing 10, the burstable top section will interconnect and burst into the lower section of the pump 20. Now the pump 20 is connected with the inside of the capsule 12. Thereafter, liquid can flow from the capsule 12 into the pump 20 so it can be pumped up. Although the configuration of the capsule 12 is described in a preferred embodiment, it is not intended to be restrictive. Other suitable manufacturing and construction options may be used, departing from the same system. Also the hose 5 and sealing cap 6 can be one molded part that is placed onto the capsule 12 after it is filled with a cleaning liquid. A smaller sealing cap 6 made from a burstable material (e.g., a thin film type of material, a special developed cap with an incision, or thinner material section, burst-able plastic, aluminium foil, or any other suitable sealing burst-able material or construction) is then put on top in the middle of capsule 12 or cap 6 to close the capsule 12 with liquid in it. The lower section of the pump 20 will puncture the burstable seal 6 when capsule 12 is inserted.

8 A closing cap is placed onto the lower side of the casing 10, to seal off the capsule 12, after the capsule 12 has been inserted. Closing 8 may, for example, be screwed into the bottom portion of casing 10.

10 A housing and fluid reservoir preferably comprised of a hollow casing wall unit with two open ends. The casing 10 preferably becomes narrower at the top. In this narrower section, a small preferably tubular pump 20 is fixed. At the upper right and left side of the casing 10, there are four limbs 19. In each of them there is a small hole 9. The two arms 24 or 40 fit into these sections, via limbs 2, where they can pivot.

11 Two small springs that are positioned on alternate sides of the upper casing 10. They are held in place by the two arms 24, and the casing 10. This biasing effect can also be achieved by integrating a pliable or spring-like construction into casing 10 and wiping arm 24 (or 40). These parts 10 and/or 24 (or 40) preferably then both would be injection-molded parts. Such a system could replace the two springs 11. Still further, a separate but integrated spring (e.g., a leaf spring) may be provided on casing 10 and/or on wiping arm 24 (or 40).

12 A replaceable and/or removable (preferably disposable) capsule or other container containing a cleaning liquid. It includes a hollow casing with one open end (which is sealed by sealing cap 6). The capsule is inserted into the casing 10 and connects with the lower end of the pump 20. In the preferred embodiments of the convention, container 12 is rigid or semi-rigid, thereby substantially shape-retaining. For purposes of the present discussion, it will be assumed that container 12 is a capsule with a burst-able top section 6.

13 An activation means like an atomiser trigger that is coupled to an evacuation means 20.

14 A cap/container for providing access to the lower portion of the eyeglass-cleaning device; if configured as a container, it may be used to store spare wiping components 4.

18 Two plates at the distal ends of arms 24 that are used to retain the replaceable wiping components 4. See, e.g., FIGS. 6-8 and 15.

20 An evacuation means like a small tubular pump that fits into the narrow open upper end of the casing 10. In the preferred embodiments of the invention, the pump is a manual pump, of the type commonly used in small perfume bottles. However, it may instead be configured as an electric pump. Still further, pump 20 may be omitted entirely in favor of an aerosol or similar pressurized container 12.

22 A cover/container that is placed over casing 10 and is detachably clicked with snap-fit engagements 7a and 7b onto casing 10. This can help to seal off and attach the liquid capsule 12 into casing 10. Cover/container 22 preferably has a section inside that captures capsule 12, and where capsule 12 can be replaceably fixed.

24 Two pivoting arms, each having at its upper end, an inwardly extending section 17 to attach plate 18. At the lower end of these arms 24 there are small preferably cylindrical extending limbs 2. These are clicked into the holes 9 of the casing 10

30 A storage cover that is placed over the cleaning device 1 when not in use. When this storage cover 30 is pulled off, it preferably can be placed onto section 3 of cover/container 22 while using the device (preferably being held in place by an interference fit between the two components). Preferably, there are a number of evaporating holes 61 in storage container 30.

As indicated above, device 1 includes a casing 10 where a replaceable capsule 12 filled with a cleaning liquid is inserted. A pump 20 is fixed inside the upper casing. On top of this pump there is an atomiser button 13. The arms 24 are clicked into the designated holes 9 in the limbs 19, so that arms 24 can pivot. Two springs 11 are captured between the casing 10 and the two arms 24. When the protection cap 30 is pulled of, the two arms 24 open automatically due to the biasing effect of the springs 11. This allows the arms 40 to be placed over the eyeglass very easy. When the atomiser button 13 is pointed toward the eyeglass and pressed, cleaning liquid is atomised onto the eyeglass. The two arms 24, with the replaceable wiping components 4, are placed and pressed onto the eyeglass. Then the user makes a rotating movement to clean the eyeglass.

In addition, the following components are provided with respect to eyeglass-cleaning device 38, with reference to FIGS. 12-14.

Button 39 (replacing button 13) that includes a circular outer wall, a closed upper end, and an open lower end with three hollow channels: one positioned longitudinally onto the pump 20 and then splits into two open channels that terminate into outlets to which hoses 56 may be attached.

Arms 40 (replacing arms 24) that preferably have a conduit for running hoses 56 and have the other features described below for permitting cleaning fluid to be omitted from their distal ends.

56 Two small hollow flexible hoses that run and are attached from the button 39 to the atomiser and nozzle mechanism 62 in the arms 40.

58 Two very small caps, each with an even smaller hole in it of the type commonly used in small perfume bottle buttons that functions as an atomizer, are placed into the atomiser and nozzle section 62 of each arm 40, allowing the cleaning agent to run through this atomiser, being atomised, drop-wise emitted in the wiping components, or very softly onto both sides of the eyeglass lens.

As indicated above, device 38 also includes a casing 10 where a replaceable capsule 12 filled with a cleaning liquid is inserted. A pump 20 is fixed inside the upper casing. On top of this pump there is an atomiser button 39 that has three open channels to pump up the liquid and divide it into two separate channels. Connecting with these two channels, there are two small flexible hoses 56. These flexible hoses run from the button to the atomiser mechanisms 62 in the two arms 40. These arms are clicked into the designated holes 9 in the casing 10 (but in this embodiment omitting limbs 19), so that arms 40 can pivot. Two springs 11 are captured between the casing 10 and the two arms 40. When the protection cap 30 is pulled of, the two arms 40 open automatically due to the biasing effect of the springs 11. This allows the arms 40 to be placed over the eyeglass very easy. The atomiser button 39 is pressed and cleaning liquid goes from the pump 20 through the hoses 56 into the atomiser mechanisms 62, and then in or through the two wiping components 4 onto both sides of the eyeglass. The two arms 40, with the replaceable wiping components 4, are placed and pressed onto the eyeglass. Then the user makes a rotating movement to clean the eyeglass.

Production and Materials

Most of the components in the devices according to the present invention are preferably manufactured with injection, rotation or blow molding. Any or all of such components may be constructed of various types of plastics, composite or any other well-known material. However, the material choices are to be considered in all respects as illustrative and not restrictive The Wiping Components The present invention contemplates a wide variety of different configurations for the wiping components 4 and a wide variety of different ways for attaching the wiping components 4 onto the arms 24 or 40. Three such configurations 60, 80 and 100 are described below.

Figure 6A:
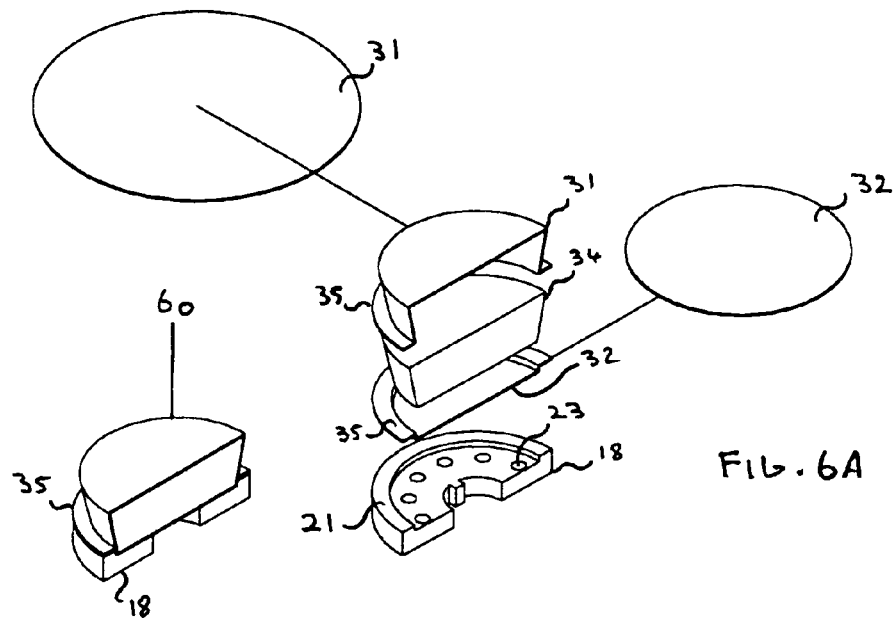
FIGS. 6A-C show exploded perspective cut-away side views of three different respective configurations of the wiping components.
Figure 6B:
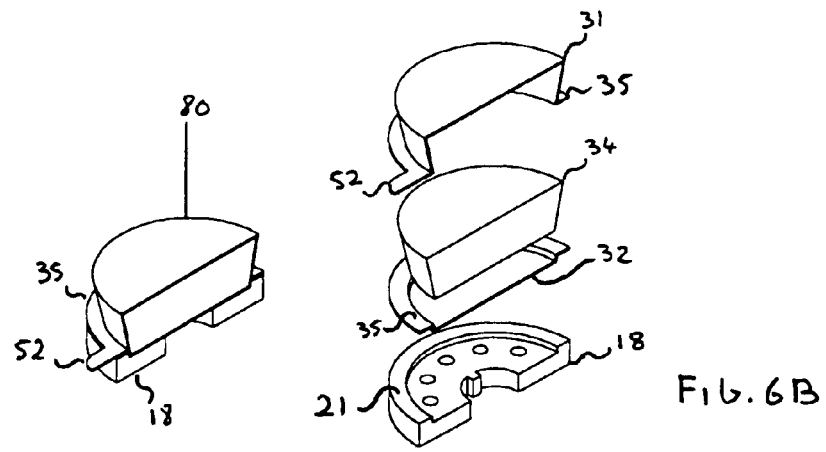
Figure 6C:
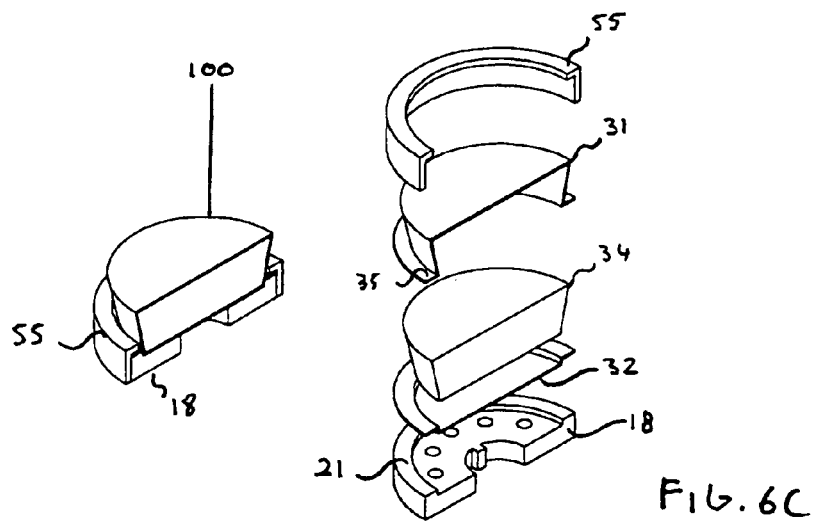
Figure 7A:
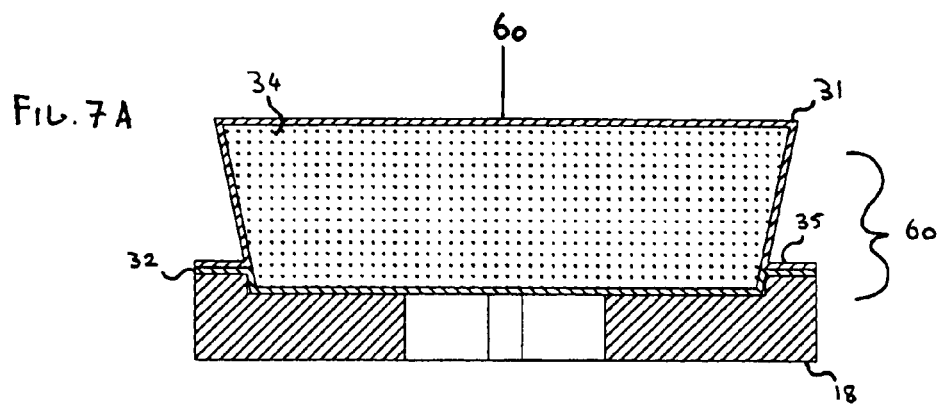
FIGS. 7A-C show cross-sectional side views of the three different respective configurations of the wiping components.
Figure 7B:
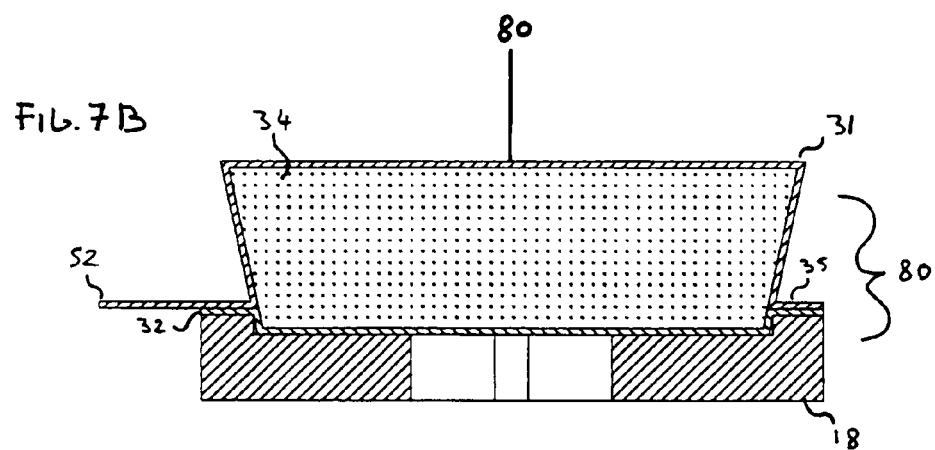
Figure 7C:
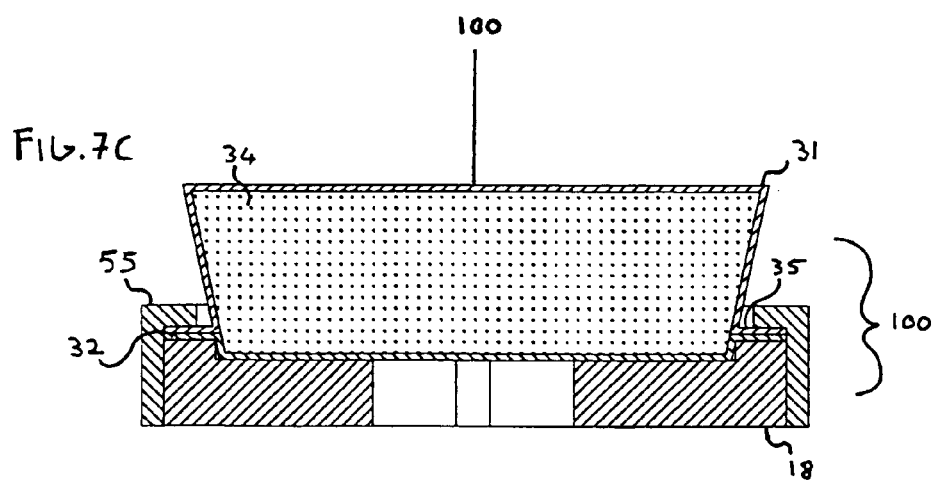

Configuration 60:

As shown in FIGS. 6-8, wiping component 60 preferably is comprised of two pieces of fabric, reinforced cloth or other suitable wiping material 31 and 32. A soft pad, sponge material, or other suitable material with a preferably oblique cross-section 34 preferably is captured between the two wiping pieces 31 and 32. These two wiping pieces 31 and 32 are industrially attached and pressed together, leaving an extending section 35 around the perimeter of the wiping component 60. In this configuration, each wiping component 60 is permanently attached to its corresponding plate 18, e.g., using a permanent glue, and plates 18 preferably are replaceably mounted onto section 17 of wiping arm 24 or 40, or directly onto wiping arm 24 or 40. See FIGS. 15A-D. The fastening of plate 18 onto section 17 may be done in various ways, such as: by screwing it onto section 17, in which case a screw thread preferably is integrated into both section 17 and plate 18, or by simply pressing plate 18 onto section 17, using a snap-fit construction. Different ways of fastening may be used and are within the scope of the invention. As shown, plate 18 preferably has an indented central portion into which the main portion of wiping component 60 may be seated, and providing an outer lip 21 which is overlaid by extending section 35 of the wiping component 60.

Configuration 80:

As shown in FIGS. 6-8, wiping component 80 preferably is comprised of two pieces of fabric, reinforced cloth or other suitable wiping material 31 and 32. In this configuration 80, wiping piece 31 has a small extending tab 52.

This tab 52 is used to easily pull off the wiping component 80 when it needs to be replaced. A soft pad, sponge material, or other suitable material with a preferably oblique cross-section 34 is captured inside the two wiping components 31 and 32. These two wiping pieces 31 and 32 are industrially attached and pressed together, leaving an extending section 35 around the perimeter of the wiping component 80. In this configuration, each wiping component 80 is replaceably attached to its corresponding plate 18, e.g., by means of Velcro, paint glue, or any other non-permanent adhesive that is applied onto the bottom of wiping material 32 or plate 18. When the adhesive is applied onto wiping component 80, it preferably is covered by a strip (e.g., made of paper or plastic) that first has to be peeled away before the wiping component 4 can be replaceably fixed onto plates 18. The paint glue, Velcro or other non-permanent adhesive may instead be applied only onto the extending section 35 of the wiping component 80. Any other suitable detachable way of fixing may be used. The plates 18 can be replaceably or permanently mounted onto section 17 of wiping arm 24 or 40, or directly onto wiping arm 24 or 40. The fastening of plate 18 onto section 17 of wiping arm 24 or 40 may be done in different ways such as by screwing plate 18 onto section 17; in this case a screw thread preferably is integrated into both pieces 17 and 18, or by simply pressing it onto section 17. Different ways of fastening may be used, and are within the scope of the invention. As shown, plate 18 preferably has an indented central portion into which the main portion of wiping component 80 may be seated, and providing an outer lip 21 which is overlaid by extending section 35 of wiping the component.

Configuration 100:

As shown in FIGS. 6-8, wiping component 100 preferably is comprised of two pieces of fabric, reinforced cloth or other suitable wiping material 31 and 32. A soft pad, sponge material, or other suitable material with a preferably oblique cross-section 34 preferably is captured between the two wiping pieces 31 and 32. These two wiping pieces 31 and 32 are industrially attached and pressed together, leaving an extending section 35 around the perimeter of the wiping component 100. In this configuration, each wiping component 80 is replaceably attached to its corresponding plate 18 by means of placing the fastener 55 over the edge of plate 18. Fastener 55 will then press the extending edge 35 of wiping component 4 against the upper section of plate 18. The fastening of part 55 onto plate 18 may be done in different ways such as by snapping it (using a snap-fit construction) or screwing it onto the side of plate 18. In this latter case, a screw thread preferably is integrated into both components 55 and 18. Different ways of fastening may be used, and are within the scope of the invention.

Fastener 55 may also be hinged 200 onto plate 18. See FIG. 17. When the wiping component has to be replaced, fastener 55 is opened by pulling fastener 55 pivotally upwards. The wiping component 100 can now be removed and replaced. A new wiping component 100 can be fixed onto plate 18, by pivotally pulling fastener 55 downward. An easy fastening and opening engaging-clicking system 202A-B in plate 18 and fastener 55 secures part 55 onto part 18, pressing the extending edge 35 of the wiping component between both sides of components 18 and 55. See FIG. 17. Part 55 may be integrally formed with plate 18, so as to be one part, or can be provided as a separate part that is pivotally hinged onto plate 18. Plate 18 and fastener 55 preferably are permanently mounted on, or integrated into, the arms 24 or 40. Different ways of fastening may be used, and are within the scope of the invention. In this particular configuration, both sides of wiping component 100 generally can be used. When one side is dirty, fastening part 55 is detached and wiping component 100 is turned around and detachably fixed onto plate 18, again using fastening part 55.

The plates 18 can be replaceably or permanently mounted onto section 17 of wiping arm 24 or 40, or directly onto wiping arm 24 or 40. The fastening of plate 18 onto section 17 of wiping arm 24 or 40 may be done in different ways such as by screwing plate 18 onto section 17; in this case a screw thread preferably is integrated into both pieces 17 and 18, or by simply pressing it onto section 17. Different ways of fastening may be used, and are within the scope of the invention. As shown, plate 18 preferably has an indented central portion into which the main portion of wiping component 100 may be seated, and providing an outer lip 21 which is overlaid by extending section 35 of wiping component 100.

In any of the embodiments described above, the arms 24 or 40 may be integrated into casing 10, and therefore become one part. In this case, arms 24 or 40 generally will not be able to pivot. An example of a structure and operation to replaceably attach and detach the combination of a wiping component 4 and plate 18 in this situation can be seen in FIGS. 15A-D.

Figure 15A:
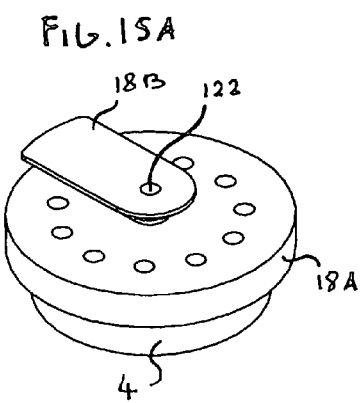
FIG. 15A shows a top perspective view of a combination of a wiping component and a backing plate.
Figure 15B:
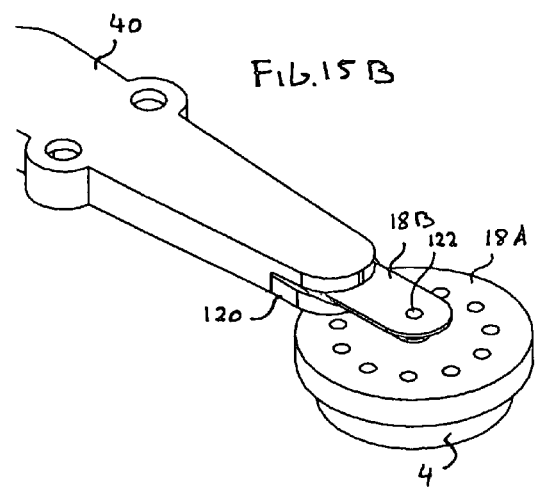
FIG. 15B shows a top perspective view of the combination wiping component and backing plate while being slid into a wiping arm.

FIG. 15A illustrates a top perspective view of a combination of wiping component 4 and backing plate 18. In this embodiment, backing plate 18 is comprised of two subcomponents, a main plate 18A and a guiding section 18B for inserting into the wiping arm 24 or 40. In the present example, it is assumed that wiping arm 40 is used. More specifically, as shown in FIG. 15B, guiding section 18B permits backing plate 18 (with wiping component 4 attached) to be longitudinally slid onto arm 40.

Figure 15C:
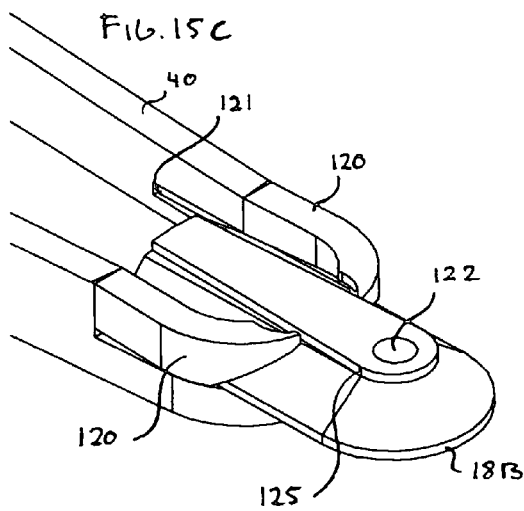
FIG. 15C shows a bottom perspective view of the guiding section of a wiping component backing plate, partially inserted into a wiping arm.
Figure 15D:
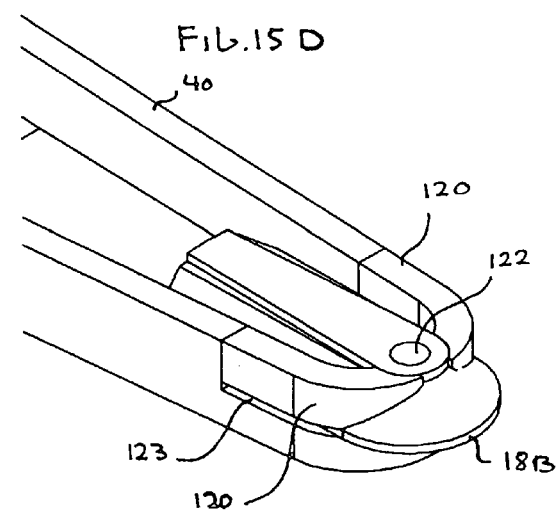
FIG. 15D shows a bottom perspective view of the guiding section of a wiping component backing plate, fully inserted into a wiping arm.
Figure 17A:
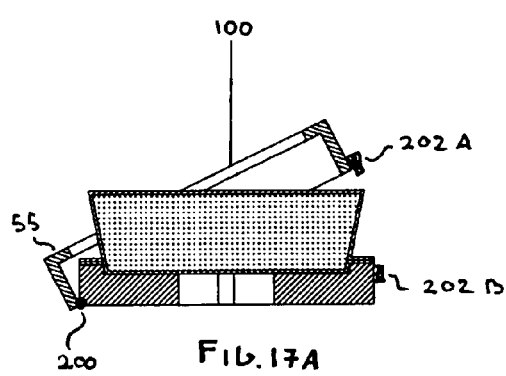
FIG. 17A illustrates a cross-sectional view and FIGS. 17B-D illustrate perspective views of a wiping component and a backing plate having a hinged retention component for securing the wiping component.
Figure 17B:
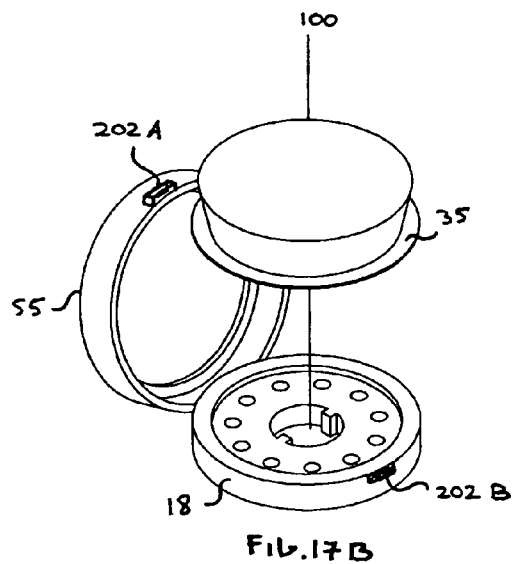
Figure 17C:
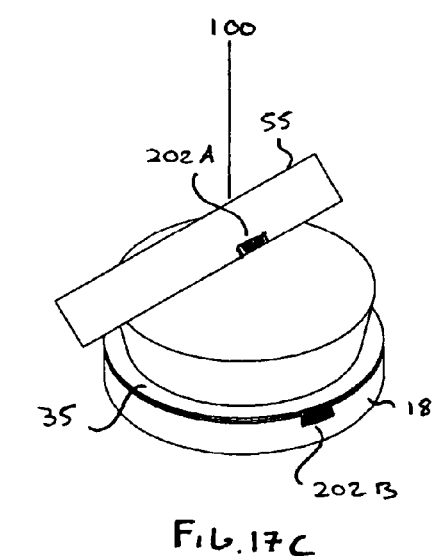
Figure 17D:
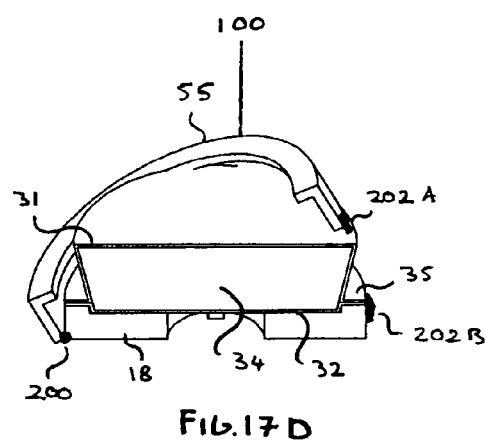

This is illustrated in more detail in FIGS. 15C-D, which show a bottom perspective view of guiding member 18B. The main plate 18A and wiping component 4 have been omitted in these figures in order to more clearly show the detachable attachment mechanism according to the preferred embodiment of the invention. As shown, the bottom of guiding member 18B includes an elongated bottom element 125, which fits between arms 120 of wiping arm 40. Bottom element 125 preferably becomes narrower as it extends away from the center of backing plate 18. As a result, when initially inserted into wiping arm 40 bottom element 125 easily fits between arms 120 and enters grooves 121. Then, the widening of element 125 causes it to first contact the edges of arms 120 and then to push arms 120 apart. Finally, when element 18B is fully inserted (as shown in FIG. 15D), element 125 clears arms 120, causing them to snap back into position and lock element 18B into position. However, with sufficient force, element 18B (with the main portion 18A of backing plate 18 and wiping component 4 attached) can again be pulled out from arm 40.

In the present embodiment, the grooves 121 and snap arms 120 are integrated into the arms 24 or 40. See FIGS. 15A-D. When they have to be removed, they are pulled longitudinally out of the groove 121. The snap arms 120 that are integrally formed with the arms 24 or 40, have a small open section 123, so they can resiliently bend outwards, this resilient effect is possible due to the resilient character of the material from which the arms 24 or 40 are fabricated, such as any of various resilient plastics. The groove 121 and snap arms 120 may also be integrated into the backing plates 18, in this case backing plate 18 is longitudinally slid onto a corresponding section that is incorporated into the arms 24 or 40.

As also shown in FIGS. 15C-D, a hole 122 extends through guiding element 18B and, although not shown, also through main plate 18A. This hole 122 allows fluid from hoses 56 to be provided to (or through) wiping component 4.

The above configuration for attaching the plates 18 onto the arms 24 or 40 (shown in FIGS. 15A-D) can be combined with any of the options of fixing the wiping components 4 onto plates 18 (e.g., as described above for configurations 60, 80, and 100).

The snap-click components 120 (see FIGS. 15A-D) can be implemented into the plates 18, arms 24 (or 40) or in both. Although the shape, form and construction of such a system are described in a preferred embodiment, it may be done differently. For example, plates 18 may be held in place by using a dovetail groove in arms 24 (or 40) or in plate 18, instead of the structure set forth in FIGS. 15A-D.

As seen in FIG. 16, in a further embodiment of the invention, the casing 10, with integrated or separately pivoting arms 24 (or 40) may be longitudinally divided into two parts. These two preferably injection-molded parts, which comprise casing 10 and arms 24 (or 40) integrated in one part 160, are hinged to each other with the hinged construction 124 that attaches both parts 160 together, enabling them to open, so a cleaning liquid capsule or spray-dispenser can be inserted or replaced. Such a configuration also makes it possible to replace the wiping components 4 without having to detach plates 18.

In this embodiment of the invention, the capsule 12 or spray dispenser can be injected longitudinally (see FIG. 16, element 164) into the device 110. One of the parts 160 is closed against the other by swinging it over the other part 160, with lower section 166 of one of the parts 160 closing the device. Capsule 12 is now blocked and sealed off. The closing of both halves 160 can also be done by putting a closing cap 180 over the device 110. See FIG. 16. The liquid capsule or spray-dispenser is inserted in the designated place in the device 110.

See FIG. 16. Then, both parts 160 (each comprising a wiping arm 24 or 40 and a casing 10) are closed by clicking them together, using an easy-to-open-and-close snap-click engagement 168. The storage cover 30 then can be placed over the device 110 when not in use.

In this specific embodiment, casing 10 and wiping arm 24 or 40 can be one injection-molded part 160. Alternatively, the device may use separate parts 10 and 24 (or 40).

The spare wiping components may be stored away in either or both of the parts 160, or in the storage container 30.

Although the spray-dispenser and/or pump 20 and the spray head 13 is generally illustrated in the preferred position, it may be positioned instead at the end of the device.

Both parts 160 may also be separately clicked onto each other without being attached by the hinges 124.

Although the invention is set forth and described in a preferred embodiment, it may be different. For example, casing 10 and wiping arm 24 or 40 may be molded into a single unitary piece 160. In such an embodiment, the limbs 19 generally will not be necessary. The preferred embodiment is thus illustrative and not restrictive.

Figure 9:
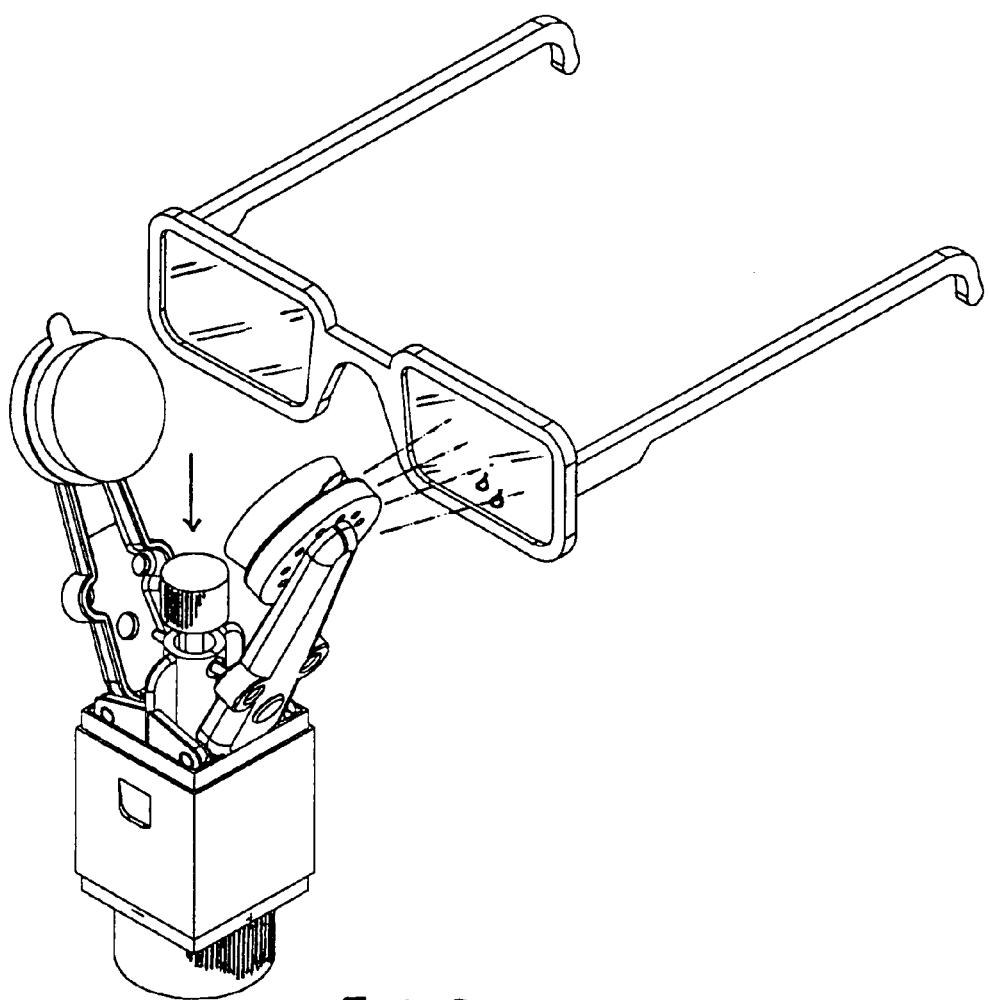
FIG. 9 illustrates a rear perspective view of an eyeglass-cleaning device according to the first embodiment of the present invention, in use, with liquid being atomized or sprayed onto the spectacle lens of an eyeglass.
Figure 10:
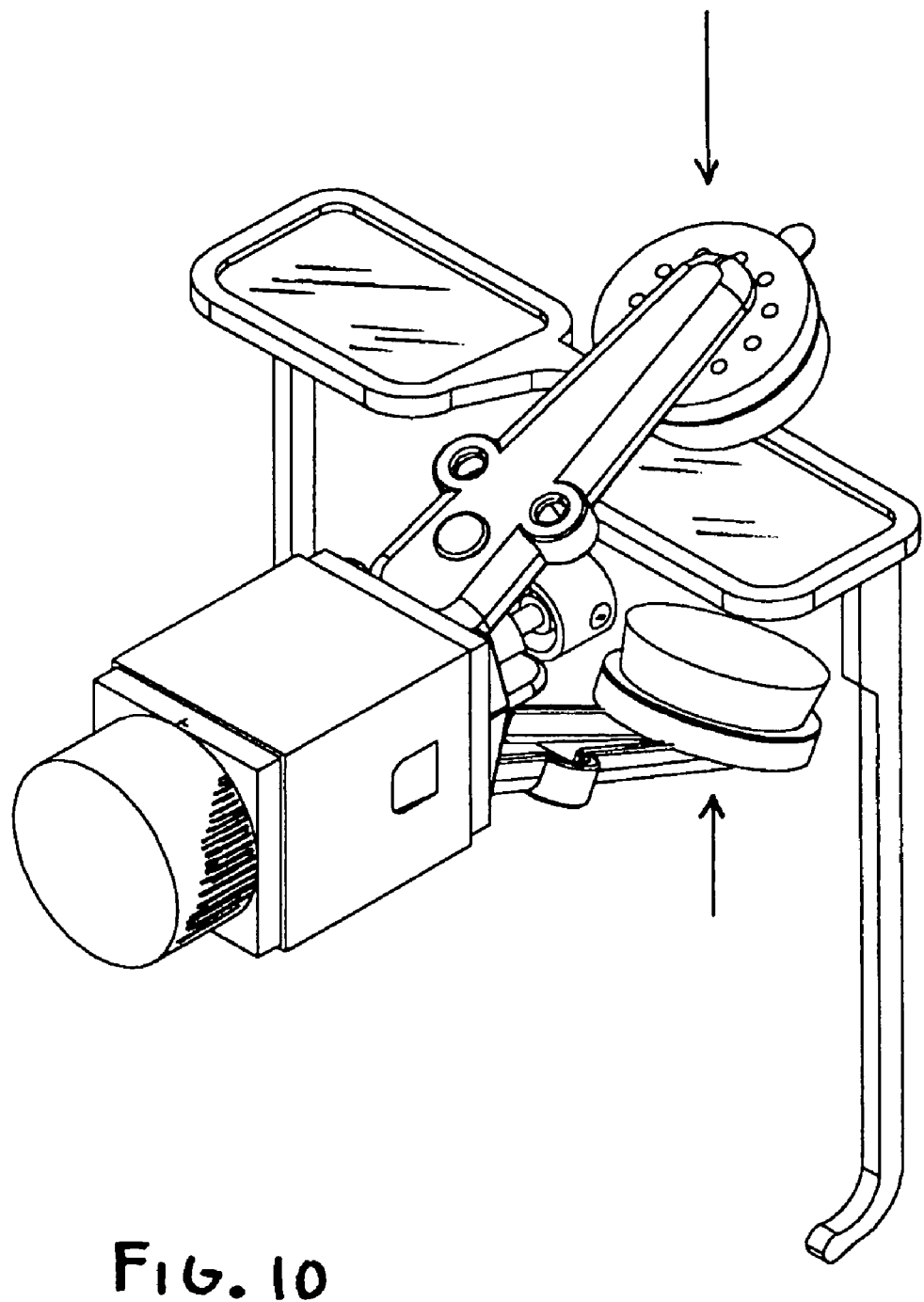
FIG. 10 illustrates a perspective view of an eyeglass-cleaning device according to the present invention in use, with the spectacle lens of an eyeglass being cleaned by the wiping components of the device.

Eyeglass cleaning is performed by placing the two (preferably rotating) arms 24 or 40 over the lens, pressing the arms and wiping components against both sides of the spectacle lens, and then wiping off the lens by means of making a rotating or other appropriate movement. FIG. 9 illustrates a perspective view of the device 1 with cleaning fluid being sprayed from the spray button 13 onto the spectacle lens. FIG. 14 shows a perspective view of the device 38 according to the second embodiment of the invention, with liquid is being atomised or sprayed through the wiping component on each side of the spectacle lens. After the eyeglass is cleaned, the arms 24 or 40 are compressed inwardly and the protection cap 30 is placed over the device 1 or 38.

The user takes the eyeglass cleaning apparatus. He can atomise a spectacle lens with the cleaning fluid that is inside the housing by pressing the atomiser button that is connected to an evacuation device such as a pump. The atomiser button having a main liquid channel 13a connected to the evacuation device, which is preferably constructed and arranged parallel longitudinally with the arms and the housing so it can be positioned and assembled compactly and is easily accessible by the user's fingers. Now he can place both arms with the wiping pads over the lens and squeeze them together so they contact upon the upper and lower spectacle lens surfaces. He can move the arms and wiping pads to clean and dry the spectacle lens. Once this is done, he can release the arms to remove the spectacle lens from the apparatus.

Structural and Functional Variations

The disclosure above generally describes certain specific embodiments of the present invention. In addition, the following variations on those embodiments also are possible.

Springs 11 (or other types of springs, e.g., leaf springs instead of coil springs) may instead be integrated into either or both of casing 10, on the one hand, and wiping arms 24 or 40 (See FIG. 2B), on the other. That is, they may be integrated into the molded parts 24, 40 or 10 and be of the same material, so as to be integrally formed. Still further, the spring biasing effect may be achieved by making either or both of such components from a spring-like material.

Another embodiment of the invention utilizes a conventional spray dispenser bottle (typically having a combined pump and fluid container) that is stored into part 10. Alternatively, as noted above, an electric pump or pressurized system (e.g., aerosol) may instead be used.

The spare wiping components 4 instead may be stored in a compartment in the storage cover 30. Alternatively, they may be stored in a separate cap/container that is detachably attached (e.g., clicked onto) storage cover 30.

Plates 18 may be integrated into the molded arms 24 or 40 so as to become one part.

Cover/container 22 may have a section inside that receives capsule 12, and where the capsule 12 can be replaceably fixed. For example, capsule 12 may have a screw thread on the lower outside that interconnects with a screw thread on the inside of cover/container 22. In such an embodiment, when a new capsule has to be inserted, it is placed, turned into cover/container 22 in a way that a section of the capsule 12 extends long enough to leave a good hand-grip extension for when it has to be taken out of cover/container 22. Now, cover/container 22 with the capsule inside is clicked into and over casing 10. The screw thread may also be replaced by fastening capsule 12 into part 22 by means of pressure, e.g., using a snap fit.

The device 1 or 38 can be configured so that when cap 8 is removed from casing 10, capsule 12 extends away from the lower side of casing 10, so it can be easily grabbed to pull it outwardly.

The cleaning liquid may also be poured directly into the open section of part 10. This may be done by means of a liquid capsule with a burstable top section that is pressed and placed onto a connecting section on the lower side of part 10. The cleaning liquid in the disposable capsule is now poured into the open section of part 10. Then, the lower end side of part 10 is sealed off with a closing cap, for example, cap 8.

The liquid capsule 12 may be secured by both parts 8 and 22, or by only one of these parts. In addition, parts 8 and 22 are described in a preferred embodiment; however they may be engineered in other different shapes and different ways of securing them (screw-thread, clicking system, snap-fit or other suitable system) may be utilized.

The extending section 15 of cover/container 22 may overlap the rotating arms 40, so the arms 40 stay straight, and don't open when pulling of the container 30. Then, when cover/container 22 is pulled backwards, the two arms 40 will open automatically, due to the biasing effect of the springs 11, allowing access to the wiping components 4, and facilitating replacement of them. The above-described features of cover/container 22 may also be directly integrated into casing 10.

The liquid capsule 12 may also be fixed and inserted directly into the lower section of pump 20 without casing 10 capturing it. It also (or instead) may be replaceably attached with a snap-fit click engagement or any other suitable detachable fixing construction onto the front section of casing 10, without the hollow wall set forth in the drawings capturing capsule 12.

The cleaning liquid may be transferred and applied onto the wiping components by means of atomising it, or also (or instead) by means of drop-wise emitting cleaning liquid via the pump 20, through the hose 56 and then through nozzle/atomizer section 62. In this case, when pressing the activation button 39 for pump 20, a drop of cleaning liquid will be absorbed by the wiping components. Accordingly, the liquid transfer from the capsule 12 may be done by atomizing it, by drop-wise emitting it or by spraying it.

Each wiping component 4 may have an opening in the middle for facilitating spraying or atomizing of the cleaning fluid onto the eyeglass spectacle or instead may also be a closed wiping component without such a hole in it. The cleaning liquid may be applied onto a single side of the eyeglass, onto both sides of the eyeglass, or directly into the wiping components.

The hoses 56, in the embodiments where they are used, may be integrated into the wiping arms 40. This may be done by integrating these channels into the molded parts 40, or in any other possible and suitable manner. Alternatively, arms 40 may be provided with a guide into which hoses 56 are fitted.

The positioning and shape of either or both pump 20 and button 13 (or 39) may from the embodiments described above, in any of a variety of different ways.

Although wiping components 4 and plates 18 are described above and shown in the figures as having a preferred shape, they may have any other suitable shape or form.

The attachment features described above can be used and implemented in any or all variations and embodiments of the present invention.

Another embodiment of the invention is the possibility of placing two wiping components onto each of arms 24 (or 40) or section 17 of arms 24 (or 40), one sponge and one wiping component, or both integrated into each other.

Section 17 of arm 24 (or 40) with the atomizer cap 58 may also stand alone without the wiping components 4 and plates 18 fixed to it. In this embodiment, the wiping components 4 and plates 18 are mounted onto the arms 24 (or 40) at a lower or higher position onto the arms 24 (or 40), so that the integrated atomizer mechanisms 17, 62, and 58 stand alone and can directly atomize cleaning liquid onto both sides of the eyeglass.

Applying the above-described aspects of the present invention, including the system of the arms 24 (or 40) with the wiping components 4, onto an existing eye-cleaner spray dispenser are intended to be within the scope of the present invention.

The location, component and position where the spare wiping components 4 are stored may vary from embodiment to embodiment, e.g., in cap/container 14 and/or 22, in storage cover 30, in casing 10, or in any other suitable place or component.

It is noted that the function and section 3 onto part 22 may also (or instead) be implemented into part 10.

The ornamental shape, design and overall look of the said constructions and embodiments are to be considered in all respects as illustrative and not restrictive. Although they have been described above by reference to a preferred embodiment, it will be appreciated that other constructions may be devised, which are nevertheless within the scope and spirit of the invention. The embodiment described above is not to be considered restrictive.

Additional Considerations

In the description above, several different embodiments of the present invention are discussed. However, certain features of the invention are particularly useful and are worth emphasizing. In certain the preferred embodiments, the wiping arms are outwardly biased, either using a separate spring (preferably in connection with a pivot joint) or by forming the arms themselves and/or the casing of a spring-like material, with the arms projecting outwardly in their nominal orientations.

It is also preferred that a device according to the present invention includes a cleaning fluid receptacle and a means for forcing the cleaning fluid out of the device through a nozzle (preferably between the two wiping arms), out of the device as a spray or mist out through the wiping components (e.g., using hoses to transmit the cleaning fluid to the wiping components), or into the wiping components themselves (e.g., again using hoses). This may be accomplished using a pump (manual or electric) to pressurize the cleaning fluid or by using a pressurized container (e.g., aerosol) of cleaning fluid. In the preferred embodiments, the fluid receptacle is replaceable separately from the pump or other pressurization mechanism and is rigid or at least substantially shape-retaining.

In either case, the activation button (or other means) for causing the cleaning fluid to be released under pressure preferably is located near the wiping arms. As a result, a device according to the present invention typically can be utilized fairly easily with one hand. It is also preferred that the activation means the separate from the other components of the device, thereby allowing independent activation of the pressurization mechanism.

Preferably, the cleaning fluid receptacle is replaceable and disposable. This can be accomplished by using a container having a burstable seal that can be pressed against the pump, thereby bursting the seal.

In addition, the wiping components (or pads) preferably also can be replaced independently of the backing or support plates (which may be permanently fixed or attached to the wiping arms). As a result, the backing or support plate can be reused, and many more wiping components can be storage within the same volume of storage space.

In addition, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for cleaning eyeglasses, comprising
    (a) a housing;
    (b) a fluid reservoir;
    (c) evacuation means for pressurized evacuation of fluid out of the fluid reservoir, wherein said evacuation means is constructed and arranged at least partially inside said fluid reservoir;
    (d) two arms attached to the housing at their proximal ends and, extending from the housing,
    wherein each arm has a wiping pad at its distal end and is spring-biased into its nominal orientation, such that the wiping pads may be compressed toward each other;
    (e) a atomizer button coupled to said evacuation means, wherein said atomizer button is located between the arms and substantially adjacent the proximal end of said arms, whereby the user can easily access the atomizer button and instantly place the arms over the eyeglasses.

2. An apparatus according to claim 1, wherein each arm is pivotally attached to the housing.

3. An apparatus according to claim 1, wherein the evacuation means comprises a pump.

4. An apparatus according to claim 3, wherein the pump is a manual pump.

5. An apparatus according to claim 1, wherein the evacuation means comprises an aerosol system.

6. An apparatus according to claim 1, wherein the arms are fixedly attached to the housing and are formed from a resilient material.

7. An apparatus according to claim 1, wherein at least one of the evacuation means and the fluid reservoir is mounted within the housing.

8. An apparatus according to claim 1, further comprising a cover for sliding onto the housing covering the arms.

9. An apparatus according to claim 1, wherein the fluid reservoir is substantially shape-retaining.

10. An apparatus according to claim 9, wherein the fluid reservoir has a burstable seal.

11. An apparatus for cleaning eyeglasses, comprising
(a) a housing;
(b) a fluid reservoir;
(c) evacuation means for pressurized evacuation of fluid out of the fluid reservoir comprising a pump, wherein said pump is constructed and arranged at least partially inside said fluid reservoir;
(d) two arms attached to the housing at their proximal ends and, extending from the housing,
wherein each arm has a wiping pad at its distal end and is spring-biased into its nominal orientation, such that the wiping pads may be compressed toward each other;
(e) a atomizer button comprising a nozzle, said atomizer button further comprising a main channel coupled to said evacuation means and wherein said main channel having a predetermined length that is constructed and arranged substantially parallel with the longitudinal section of the arms and housing, whereby the user can easily access the atomizer button and place the arms over the eyeglasses.

12. An apparatus according to claim 11, further comprising a cover for sliding onto the housing covering the arms.

13. An apparatus according to claim 11, wherein the fluid reservoir is substantially shape-retaining.

14. A method for cleaning eyeglasses comprising the steps of:
(a) providing a housing;
(b) a fluid reservoir;
(c) evacuation means for pressurized evacuation of fluid out of the fluid reservoir comprising a pump, wherein said pump is constructed and arranged at least partially inside said fluid reservoir;
(d) two arms attached to the housing at their proximal ends and, extending from the housing, wherein each arm has a wiping pad at its distal end and is spring-biased into its nominal orientation, such that the wiping pads may be compressed toward each other;
(e) a atomizer button comprising a nozzle, said atomizer button further comprising a main channel coupled to said evacuation means and wherein said main channel having a predetermined length that is constructed and arranged substantially parallel with the longitudinal section of the arms and housing, whereby the user can easily access the atomizer button and place the arms over the eyeglasses, said atomizer causing said cleaning fluid to moisten said eyeglasses; squeezing said arms together to cause said wiping pads to contact upon an upper and lower surface of said eyeglasses; moving said wiping arms and wiping pads to cause said pads to dry and clean said eyeglasses; releasing said arms to remove said eyeglasses.

15. An apparatus according to claim 14, wherein each arm is pivotally attached to the housing.

* * * * *